(12) United States Patent
Azima et al.

(10) Patent No.: US 6,285,770 B1
(45) Date of Patent: *Sep. 4, 2001

(54) NOTICEBOARDS INCORPORATING LOUDSPEAKERS

(75) Inventors: Henry Azima, Cambridge; Martin Colloms, London; Neil Harris, Cambridge, all of (GB)

(73) Assignee: New Transducers Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/029,062

(22) PCT Filed: Sep. 2, 1996

(86) PCT No.: PCT/GB96/02165
§ 371 Date: May 13, 1998
§ 102(e) Date: May 13, 1998

(87) PCT Pub. No.: WO97/09848
PCT Pub. Date: Mar. 13, 1997

Related U.S. Application Data

(63) Continuation-in-part of application No. 08/707,012, filed on Sep. 3, 1996.

(30) Foreign Application Priority Data

Sep. 2, 1995 (GB) .................................. 9517918
Oct. 31, 1995 (GB) .................................. 9522281
Mar. 30, 1996 (GB) .................................. 9606836

(51) Int. Cl.$^7$ .................................................. H04R 25/00
(52) U.S. Cl. .................... 381/152; 381/333; 381/425; 381/388
(58) Field of Search .................................. 381/337, 345, 381/353, 354, 152, 306, 333, 388, 190, 396, 398, 386, FOR 146, 425

(56) References Cited

U.S. PATENT DOCUMENTS 1,955,682 * 4/1934 Newman et al. .................... 381/152
5,025,474 * 6/1991 Tanaka et al. ...................... 381/351

FOREIGN PATENT DOCUMENTS 2 219 712 A 12/1989 (GB) .
0263900 * 10/1988 (JP) ..................................... 381/190

* cited by examiner

Primary Examiner—Sinh Tran
(74) Attorney, Agent, or Firm—Foley & Lardner

(57) ABSTRACT

Visual display apparatus comprising a notice board in the form of a distributed mode acoustic radiator having a transducer (9) mounted thereon at a preferential location or site for coupling to resonant bending wave modes to vibrate the radiator to cause it to resonate.

8 Claims, 4 Drawing Sheets

NOTICEBOARDS INCORPORATING LOUDSPEAKERS

This application is a continuation-in-part of application Ser. No. 08/707,012, filed Sep. 3, 1996.

TECHNICAL FIELD

The invention relates to noticeboards and the like visual display apparatus.

BACKGROUND ART

It is known from GB-A-2262861 to suggest a panel-form loudspeaker comprising:

a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;

a mounting means which supports the panel or attaches to it a supporting body, in a free undamped manner;

and an electro-mechanical drive means coupled to the panel which serves to excite a multi-modal resonance in the radiator panel in response to an electrical input within a working frequency band for the loudspeaker.

U.S. Pat. No. 3,247,925 of WARNAKA discloses what purports to be a low frequency resonant panel loudspeaker mounted in a chassis and excited by an electromechanical transducers mounted on the chassis.

DISCLOSURE OF INVENTION

Embodiments of the present invention use members of nature, structure and configuration achievable generally and/or specifically by implementing teachings of our parent application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in parent application Ser. No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with visual display apparatus incorporating acoustics devices e.g. in the form of loudspeakers.

Members as above are herein called distributed mode acoustic radiators and are intended to be characterised as in the above parent application and/or otherwise as specifically provided herein.

The invention is visual display apparatus comprising a notice or the like board to which notices or the like can be fixed e.g. with pins, characterised in that the notice or the like board is a member having capability to sustain and propagate input vibrational energy by bending waves in at least one operative area extending transversely of thickness to have resonant mode vibration components distributed over said at least one area and have predetermined preferential locations or sites within said area for transducer means and having a transducer mounted wholly and exclusively on said member at one of said locations or sites to vibrate the member to cause it to resonate forming an acoustic radiator which provides an acoustic output when resonating. The radiator may have a cellular core sandwiched between skin layers. The skins may comprise paper. The core may comprise paper honeycomb. The visual display apparatus may comprise a frame surrounding the radiator. A resilient suspension may be employed to mount the radiator in the frame. The frame may have a return lip concealing the suspension. The transducer may comprise a piezo electric bender.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
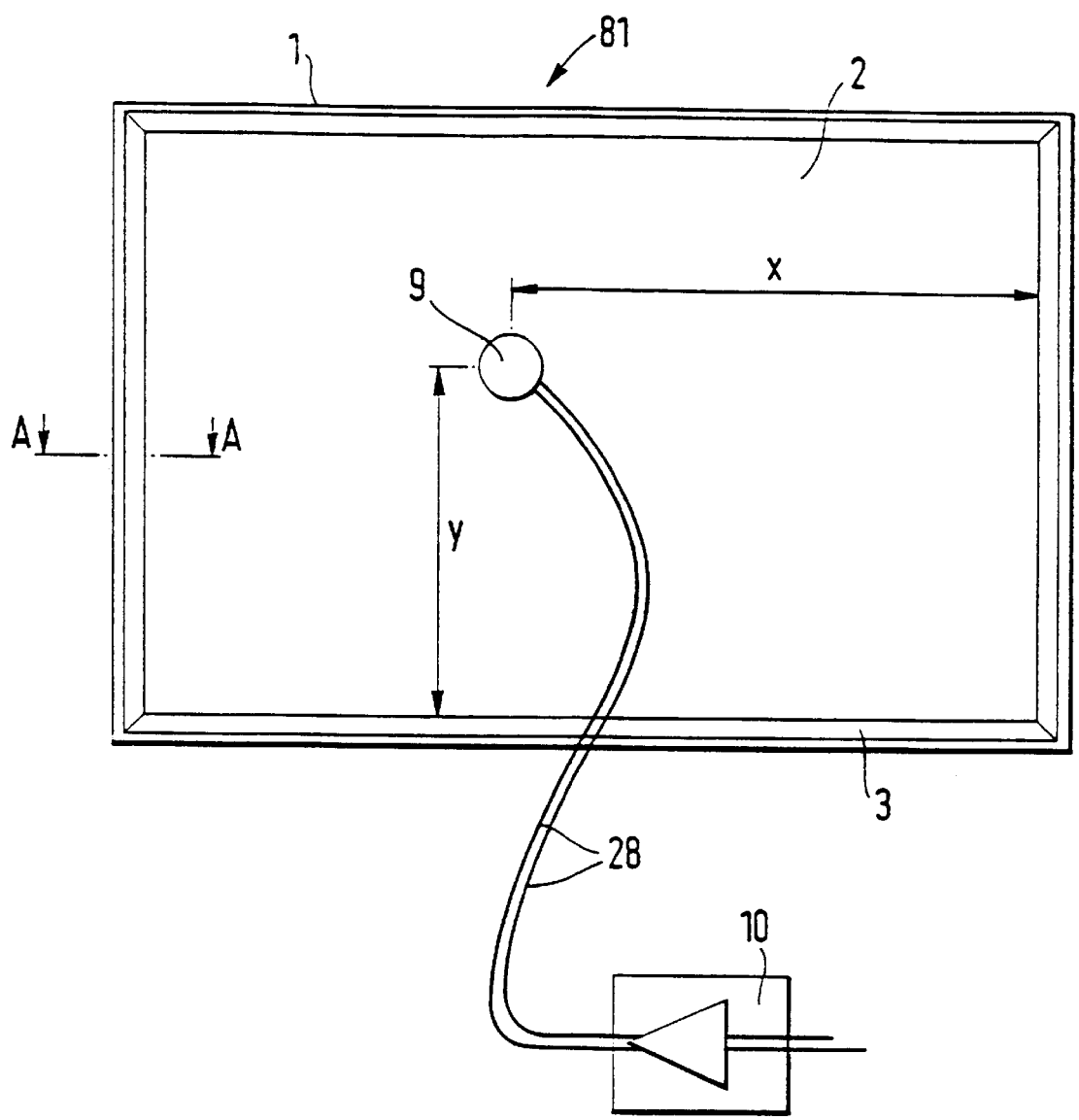
FIG. 1 is a diagram showing a distributed-mode loudspeaker as described and claimed in our parent application Ser. No. 08/707,012.

Referring to FIG. 1 of the drawings, there is shown a panel-form loudspeaker (81) of the kind described and claimed in our parent application Ser. No. 08/707,012 comprising a rectangular frame (1) carrying a resilient suspension (3) round its inner periphery which supports a distributed mode sound radiating panel (2). A transducer (9) e.g. as described in detail with reference to our application Ser. Nos. 09/011,773, 09/011,770 and 09/011,831 is mounted wholly and exclusively on or in the panel (2) at a predetermined location defined by dimensions x and y, the position of which location is calculated as described in our parent application Ser. No. 08/707,012, to launch bending waves into the panel to cause the panel to resonate to radiate an acoustic output.

The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88 dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
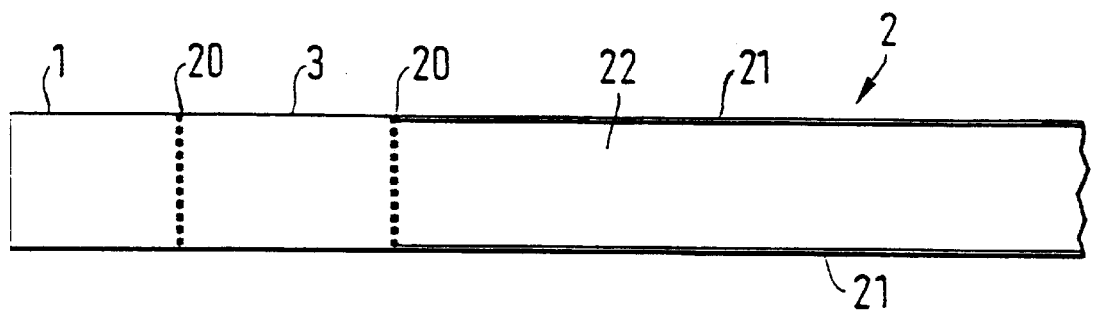
FIG. 2a is a partial section on the line A—A of FIG. 1.
Figure 2B:
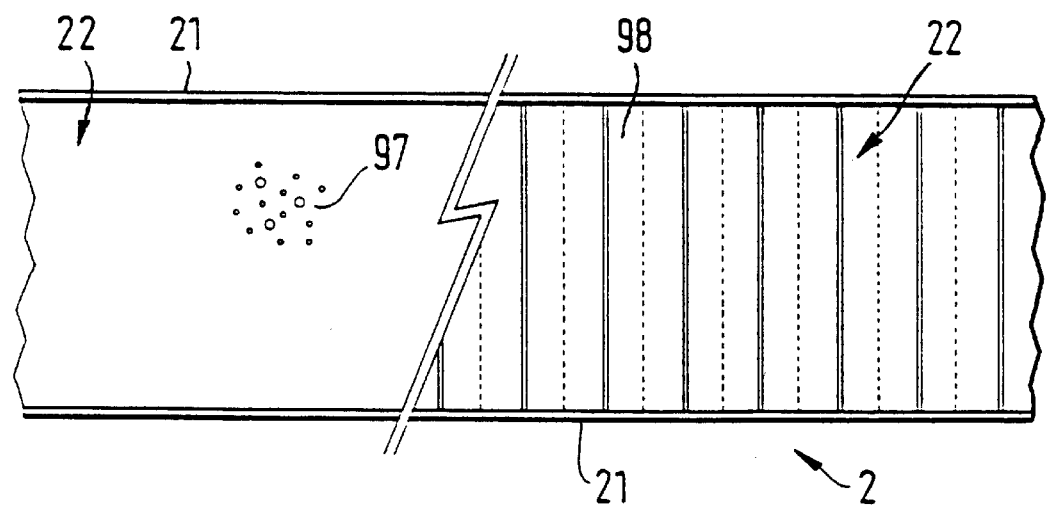
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar (RTM) or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameters. This material self forms an orientated crystal structure in the direction of injection, a preferred orientation for the good propagation of treble energy from the driving point to the panel perimeter.

Additional such moulding for this and other thermoplastics allows for the mould tooling to carry location and registration features such as grooves or rings for the accurate location of transducer parts e.g. the motor coil, and the magnet suspension. Additionally, with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Kevlar (RTM), Nomex (RTM), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 meter distant unless specific compensation counter measures are taken.

Where it is important to maintain the screening in an application, electrical connection can be made to the conductive parts of an appropriate DML panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significantly for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bi-directional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound quality and requiring only one transducer and no crossover for a full range sound from each panel diaphragm.

The acoustic panel technology of FIGS. 1 and 2 can be applied to the design of normal board material commonly used for notices and display advertising, the normal processing of these boards e.g. lamination, screen printing or spray painting, being unhindered.

The board itself may thus be specified, dimensioned and electrodynamically driven to operate as a wide coverage acoustic radiating panel i.e., a flat loudspeaker. As such, a moderate audience of up to 10 persons for a small 0.56 m square meter panel or 30–50 persons for a 0.7 to 1.2 square meter size may be served at natural volume levels with highly articulate reproduction of speech and also background music or relevant sound effects, as required. Due to the naturally dispersed acoustic radiation properties of the panel, the distorting effects of local boundary reflections are minimised. A substantial physical obstruction of a proportion of the acoustic panel does not significantly impair the sound distribution.

Lower sound levels and lower levels of electrical input power are required for a given level of articulation/intelligibility.

In a preferred form the acoustic panel would comprise low cost structure of paper honeycomb or foam core 3 to 6 mm thick bonded to reinforcing paper, plastic film or plastic film coated paper skins of 0.08 to 0.3 mm thickness. The preferred drive for an inexpensive design using a flat surface or even embedded transducer, is piezo electric, operated in bending or mass loaded, vibration coupled forms.

These transducers have a naturally rising acoustic output with frequency which is predictably and optimally adjusted to a flat response by a combination of series resistive drive to the capacitance load of the transducer, and also by mass loading of the piezo element (for a given mass the acceleration is inversely proportional to frequency) and via the detailed specification of the mechanical properties of the board. By control of the fibrous loss factor in the skins, the visco elastic properties of the adhesive bonding of the skin to core, and the piezo element to the skin by applied surface laminates, including the backing for the displayed image or text, and the bulk properties of the core in shear and compression, the desired frequency response may be achieved.

Where higher sound levels and larger panels are concerned, alloy or part alloy skins will provide good energy coverage over the panel, with a proportionally lower loss factor which is appropriately matched to a higher power moving coil type of transducer. The latter has a flat region of frequency response. Where a flat, uninterrupted surface is required on both sides of the panel, the transducer may be of the embedded type concealed within. If magnetic screening is required for the latter, thin 0.5 mm mild steel foils may be included under the skin surface over the transducer area. A small gain in efficiency will also result due to improved flux linkage.

Small, low cost example of the notice board will not require specific framing or specified damping. If of the desk or counter top form, sufficient damping is provided by the simple contact of the lower edge of the acoustic panel with the surface it is placed on. The device would have a photo frame type of back rest, effective even when fabricated in light card.

Certain classes of stiff foamed plastic, e.g. unplasticised PVC, have appropriate bulk properties either self skinning or unskinned, to operate within the acoustic panel theory range. These can be used directly as acoustic panels of this type without additional stiffening skins.

Figure 3:
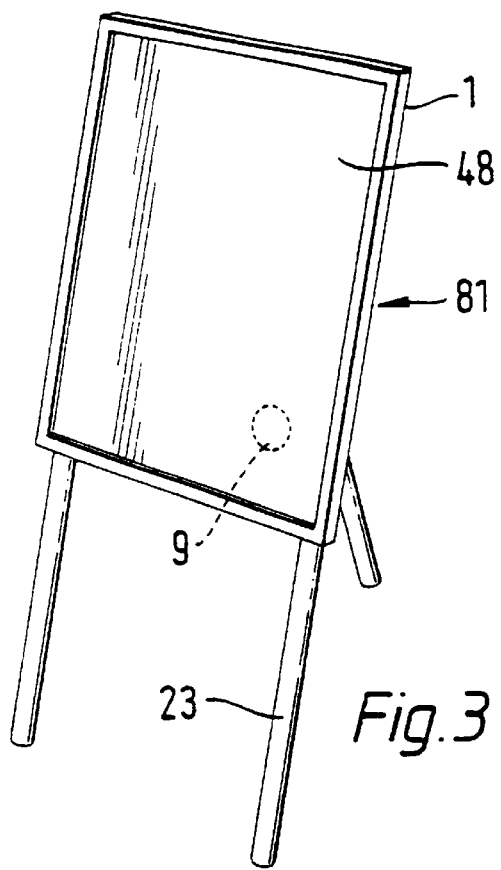
FIG. 3 is a perspective diagram of a first embodiment of noticeboard according to the present invention.
Figure 5:
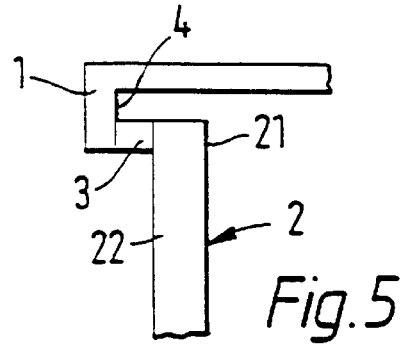
FIG. 5 is a partial cross-sectional view of the noticeboard shown in FIGS. 3 and 4.
Figure 4:
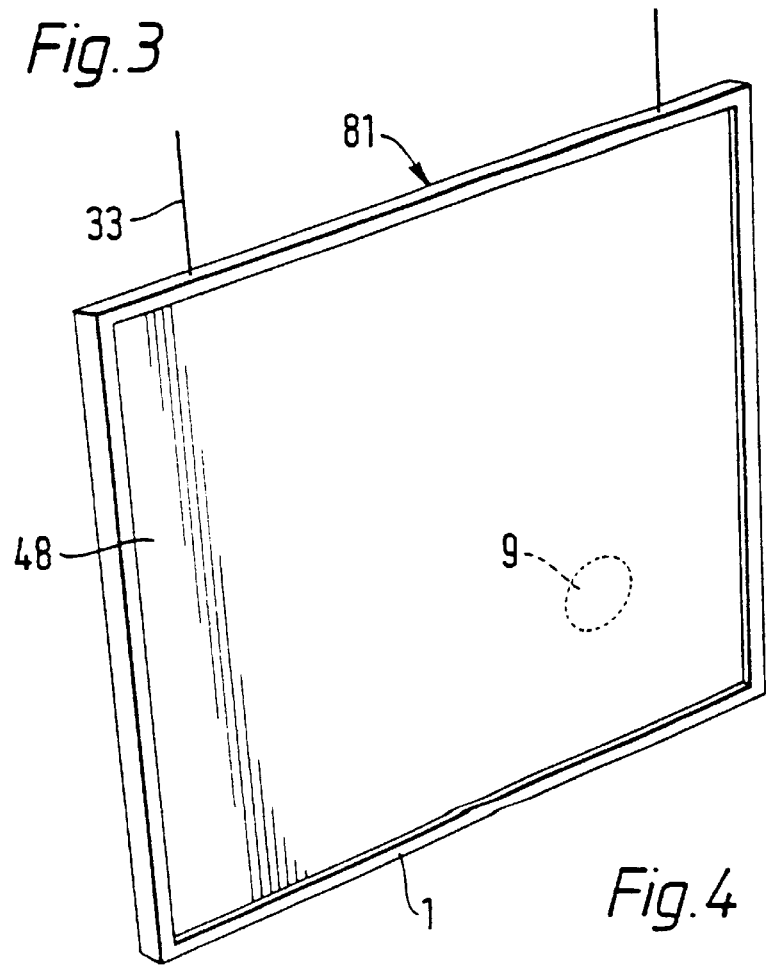
FIG. 4 is a perspective view of a second embodiment of noticeboard according to the present invention.

FIGS. 3 to 5 illustrate a noticeboard, advertising display board or the like (48) incorporating the loudspeaker technology of FIGS. 1 and 2. Thus a loudspeaker (81) incorporating a rigid lightweight distributed mode acoustic radiator panel (2) of the kind shown in FIGS. 1 and 2 has graphic information, e.g. text and/or pictures of any desired kind printed on the panel (2). The graphic information can then be supplemented by an audio message via the loudspeaker to reinforce the message.

As shown in FIG. 3 the loudspeaker/display board (48) is mounted on a stand (23) in the form of an easel. Alternatively the loudspeaker/display board may be suspended on wire (33) as shown in FIG. 4. Alternatively the noticeboard may be supported in any other desired manner.

As shown in FIG. 5 the frame (1) may incorporate a return lip (4) to conceal the resilient suspension (3) which is attached between the rear face thereof and the peripheral margin of the panel (2).

Figure 6:
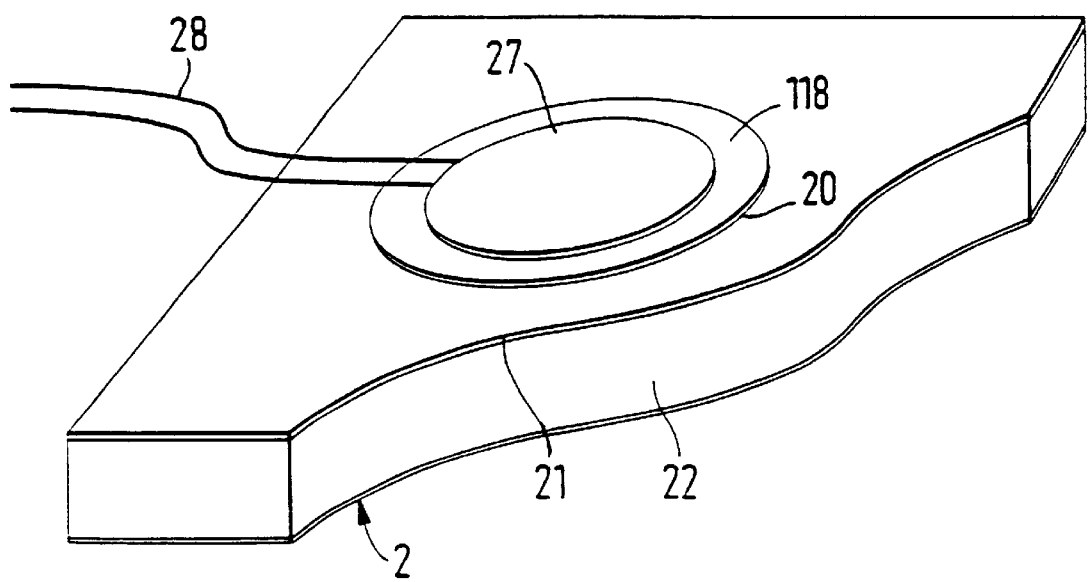
FIG. 6 illustrates one form of transducer.

FIG. 6 shows a transducer (9) for a distributed mode panel (2) in the form of a crystalline disc-like piezo bender (27) mounted on a disc (118), e.g. of brass, which is bonded to a face of the panel (2), e.g. by an adhesive bond (20). In operation an acoustic signal applied to the transducer (9) via leads (28) will cause the piezo disc (27) to bend and thus locally resiliently deform the panel (2) to launch bending waves into the panel.

What is claimed is:

1. A visual display apparatus in the form of noticeboard adapted to operate as a loudspeaker in a predetermined frequency range, comprising:

a member adapted to carry and display graphic information, the member having selected values of certain physical parameters which enable the member to sustain and propagate input vibrational energy in a predetermined frequency range by a plurality of resonant bending wave modes in at least one operative area extending transversely of thickness such that the frequencies of the resonant bending wave modes along at least two conceptual axes of the operative area are interleaved and spread so that there are substantially minimal clusterings and disparities of spacings of said frequencies, the member when resonating having at least one site at which the number of vibrationally active resonance anti-nodes is relatively high; and a transducer coupled to the member at one of said sites on the member, the transducer being capable of vibrating the member in the predetermined frequency range to couple to and excite the resonant bending wave modes in the member and cause the member to resonate and produce and acoustic output.

2. The visual display apparatus according to claim 1, wherein the member (2) has a cellular core (22) sandwiched between skin layers (21).

3. The visual display apparatus according to claim 2, further comprising a frame (1) surrounding the member.

4. The visual display apparatus according to claim 3, further comprising a resilient suspension (3) mounting the member in the frame.

5. The visual display apparatus according to claim 4, wherein the frame (1) has a return lip (4) concealing the suspension (3).

6. The visual display apparatus according to claim 2, wherein the skins (21) comprise paper.

7. The visual display apparatus according to claim 2, wherein the core (22) is of paper honeycomb.

8. The visual display apparatus according to claim 2, wherein the transducer (9) is a piezo electric bender.

* * * * *